United States Patent [19]

Samish

[11] 4,328,194

[45] May 4, 1982

[54] NITROGEN OXIDE REMOVAL PROCESS

[75] Inventor: Norm C. Samish, Houston, Tex.

[73] Assignee: Shell Oil Company, Houston, Tex.

[21] Appl. No.: 273,534

[22] Filed: Jun. 15, 1981

[51] Int. Cl.$^3$ .............................................. B01D 53/00
[52] U.S. Cl. .................................... 423/235; 423/355;
423/543
[58] Field of Search ................ 423/235, 351, 539, 543

[56] References Cited

U.S. PATENT DOCUMENTS

| | | | |
|---|---|---|---|
| 1,036,788 | 8/1912 | Blagburn | 423/351 |
| 3,864,451 | 2/1975 | Lee et al. | 423/239 |
| 3,900,554 | 8/1975 | Lyon | 423/235 |
| 4,164,546 | 8/1979 | Weltz, Jr. | 423/239 |

OTHER PUBLICATIONS

Jacobson, C. A., *Encyclopedia of Chem. Reactions,* Reinhold Pub., N.Y., 1958, p. 35, No. VII–136.
"Survey and Analysis of Flue Gas Treatment Methods", Engineering-Science, pp. II-10 to II-18, Jan., 1980.

*Primary Examiner*—G. O. Peters
*Attorney, Agent, or Firm*—Dean F. Vance

[57] ABSTRACT

A process for the selective reduction of nitrogen oxide in a combustion effluent gas stream is disclosed wherein the gas stream is contacted with sulfur at a temperature of about 445° C. to 2000° C., therein converting the NO to $N_2$ and the sulfur to $SO_2$.

9 Claims, No Drawings

NITROGEN OXIDE REMOVAL PROCESS

BACKGROUND OF THE INVENTION

1. Field of the Invention

The invention relates to the selective removal of nitrogen oxides from gas streams. More particularly, the invention relates to the selective removal of nitrogen oxide from combustion effluent gas streams by contacting said stream with sulfur.

2. Description of the Prior Art

Combustion effluents and waste gas streams have been shown to be a major source of air pollution when discharged into the atmosphere. As clearly evidenced in the Los Angeles area, unless the waste gas streams are treated to remove deleterious components, serious smog problems can develop. One of the major irritants in smog is $NO_2$. A major source of $NO_2$, in turn, is the formation of NO by combustion processes. These combustion processes include stationary sources such as power plants, process furnaces, incinerators, and the like, as well as automobiles. The $NO_x$ formed by combustion is generally discharged into the atmosphere as NO and only subsequently converted to $NO_2$.

A number of different processes for the selective removal of NO from effluent gas streams have been proposed. One process, disclosed in many patents including U.S. Pat. Nos. 3,864,451, 3,900,544, and 4,164,546, involves the injection of ammonia in effluent gas streams. A variety of other processes, including both wet and dry processes, are described in "Survey and Analysis of Flue Gas Treatment Methods", *Engineering-Science*, prepared for American Gas Association, AGA Catalog No. L51386, pp. II-10 to II-18. All of these processes have certain deficiencies which have prevented their use in large-scale treatment.

A new process for the selective removal of NO from effluent gas streams has been discovered which has potential for large-scale application.

SUMMARY OF THE INVENTION

The present invention broadly comprises a process for the non-catalytic, selective reduction of NO in a combustion effluent gas stream by contacting said NO-containing gas stream with sulfur in an amount sufficient to provide at least one mole of sulfur (as $S_8$) per 16 moles of NO. The contacting process takes place at a temperature of between about 445° C. and about 2000° C., and results in the production of a stream containing reduced NO, and wherein the NO and S are converted to $N_2$ and $SO_2$.

The present invention encompasses a process scheme which would not be contemplated by one skilled in the art, since typically it is desired to have as low as possible sulfur content in the flue gas. In the present process, however, the added sulfur results in $SO_2$ which may be readily removed in a downstream $SO_2$ removal process. Thus, the final treated flue gas stream will contain reduced NO levels in addition to acceptable $SO_2$ levels.

DETAILED DESCRIPTION OF THE INVENTION

The present invention is particularly useful in the removal of nitrogen oxides from flue gases which are formed by the combustion of a fossil fuel with air. The amount and type of nitrogen oxides in such flue gases depends on both the fuel nitrogen content and on combustion conditions, and may vary widely, from about 50 ppm to about 1500–2000 ppm. Generally, nitrogen oxide contents are greatest in flue gases produced from solid fuels. Moreover, sulfur oxides will be present when the fuel contains sulfur. Generally, some oxygen (typically about 1 to 5% by volume) will also be present due to the use of excess air in combustion. Moreover, the flue gas may contain small amounts of finely divided suspended particulate matter, such as carbonaceous material and fly ash. Ordinarily, there is little or no carbon monoxide or gas phase hydrocarbons in the flue gas. A typical flue gas will comprise about 73 percent nitrogen, 1–2 percent oxygen, 13 percent carbon dioxide, 12 percent water vapor, 200–300 parts per million (ppm) nitric oxide, and 5 to 3000 ppm sulfur dioxide. The remainder of the gas will be composed of a minor amount of unburned hydrocarbons, carbon monoxide, sulfur trioxide, nitrogen dioxide and particulate matter.

The sulfur employed in the process of this invention may be employed in a gaseous form, a liquid form or a solid powdered form. The molecular composition of sulfur vapor is a complex function of temperature and pressure. Vapor pressure measurements have been interpreted in terms of an equilibrium between several molecular species. Mass spectrometric data obtained on sulfur vapor indicate the presence of all possible $S_n$ molecules from $S_2$ to $S_8$ and of negligible concentrations of $S_9$ and $S_{10}$. In general, octatomic sulfur ($S_8$) is the predominate molecular constituent of sulfur vapor at low temperatures, but the equilbrium shifts toward smaller molecular species with increasing temperature and decreasing pressure. As employed in the remainder of the specification and the claims, sulfur will be assumed to be octatomic sulfur ($S_8$).

The overall reaction between sulfur and nitrogen oxide for this process is:

$$NO + 1/16 S_8 \rightarrow \tfrac{1}{2} SO_2 + \tfrac{1}{2} N_2 \qquad [1]$$

When oxygen is present, the following shows the overall reaction:

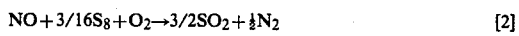

$$NO + 3/16 S_8 + O_2 \rightarrow 3/2 SO_2 + \tfrac{1}{2} N_2 \qquad [2]$$

The competing reactions for sulfur in flue gas oxidation to $SO_2$ or $SO_3$ are represented by the following reactions:

$$\tfrac{1}{2} O_2 + 1/16 S_8 \rightarrow \tfrac{1}{2} SO_2 \qquad [3]$$

$$\tfrac{3}{4} O_2 + 1/16 S_8 \rightarrow \tfrac{1}{2} SO_3 \qquad [4]$$

The thermodynamic feasibility of the above reactions were determined by computer analysis and calculation of Gibbs free energies. The various free energies for the above four reactions were calculated at four separate temperatures, and the values expressed in kilocalories per gram mole are listed below in Table 1:

TABLE 1

| Reaction No. | 0° C. | 1000° C. | 2000° C. | 5000° C. |
|---|---|---|---|---|
| 1 | −57.4 | −52.5 | −47.2 | −30.9 |
| 2 | −129.1 | −130.0 | −134.6 | −158.7 |
| 3 | −36.6 | −34.7 | −32.5 | −24.9 |
| 4 | −45.4 | −32.3 | −19.3 | +19.9 |

The above free energy values indicate that reactions (3) and (4) are less thermodynamically desirable than reactions (1) and (2), and that reactions (1) and (2) may be therefore expected to selectively proceed until the nitric oxide in the flue gas is consumed. These considerations suggest that an effective flue gas NO-removal process would consist of, e.g., spraying powdered sulfur into hot flue gas at a temperature above the vaporization temperature of sulfur (444.6° C.). The sulfur would therefore vaporize, react with NO selectively, then further react with $O_2$ in the flue gas until consumed.

Various methods may be employed for injecting the sulfur into the flue gas stream. These methods and the associated mechanical equipment may be chosen by one skilled in the art to fit the particular operation contemplated.

The temperature for reaction of the sulfur with the effluent waste gas stream should be between 445° C. and 2000° C., preferably between about 600° C. and about 1900° C.

The amount of sulfur employed is at least about one mole of sulfur ($S_8$) per 16 moles of NO, preferably between about one mole of sulfur ($S_8$) and ten moles of sulfur ($S_8$) per mole NO.

Another aspect of the present invention is that the $SO_2$ formed in the reaction, being a pollutant, must be removed in a downstream flue gas desulfurization process. One such $SO_2$ removal process is disclosed in U.S. Pat. No. 3,501,897. Other processes include wet limestone scrubbing, wet caustic scrubbing, wet lime scrubbing, and the recent spray dry removal process.

What is claimed is:

1. A process for the non-catalytic, selective reduction of NO in a combustion effluent gas stream, said process comprising contacting said gas stream containing NO with sulfur in an amount sufficient to provide at least one mole of sulfur (as $S_8$) per 16 moles of NO, at a temperature of about 445° C. to about 2000° C., therein producing a product stream containing $N_2$ and $SO_2$.

2. The process according to claim 1 wherein said sulfur is in a gaseous form.

3. The process according to claim 1 wherein said sulfur is in a powdered solid form.

4. The process according to claim 1 wherein said sulfur is in a liquid form.

5. The process according to claim 1 wherein said effluent gas stream contains $CO_2$, $H_2O$, NO, $O_2$ and $N_2$.

6. The process according to claim 1 wherein the $SO_2$ in said product stream is removed in a $SO_2$ removal process.

7. The process according to claim 6 wherein said $SO_2$ removal process is a wet caustic scrubbing process.

8. The process according to claim 1 wherein said temperature is between 600° C. and 1900° C.

9. The process according to claim 1 wherein amount of sulfur employed is between about one mole of sulfur (as $S_8$) and about 10 moles of sulfur (as $S_8$) per 16 moles of NO.

* * * * *